United States Patent
Cheong et al.

(10) Patent No.: US 9,241,318 B2
(45) Date of Patent: Jan. 19, 2016

(54) APPARATUS AND METHOD FOR RECEIVING DATA IN COMMUNICATION SYSTEM

(75) Inventors: Minho Cheong, Daejeon (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 291 days.

(21) Appl. No.: 13/336,864

(22) Filed: Dec. 23, 2011

(65) Prior Publication Data

US 2012/0177155 A1    Jul. 12, 2012

(30) Foreign Application Priority Data

Dec. 23, 2010 (KR) .................. 10-2010-0133876
Dec. 22, 2011 (KR) .................. 10-2011-0140663

(51) Int. Cl.
| | |
|---|---|
| *H04B 7/02* | (2006.01) |
| *H04L 1/02* | (2006.01) |
| *H04W 56/00* | (2009.01) |
| *H04B 7/04* | (2006.01) |
| *H04L 27/26* | (2006.01) |

(52) U.S. Cl.
CPC ............. *H04W 56/00* (2013.01); *H04B 7/0426* (2013.01); *H04L 27/2656* (2013.01)

(58) Field of Classification Search
CPC .. H04B 7/0426; H04L 27/2656; H04W 56/00
USPC ......................................... 375/267, 340, 343
See application file for complete search history.

(56) References Cited

U.S. PATENT DOCUMENTS

| | | | |
|---|---|---|---|
| 6,487,252 | B1 | 11/2002 | Kleider et al. |
| 8,194,770 | B2 * | 6/2012 | Medvedev et al. ............ 375/267 |
| 2009/0161808 | A1 * | 6/2009 | Cheong et al. ............... 375/371 |
| 2012/0045003 | A1 * | 2/2012 | Li et al. ......................... 375/260 |

* cited by examiner

*Primary Examiner* — Nader Bolourchi

(57) ABSTRACT

Disclosed is an apparatus for receiving data in a communication system, including a receiving unit configured to receive data through a multi-channel in a MIMO (multi-input multi-output) scheme; a calculating unit configured to calculate a receiving power distribution value in each antenna of a multi-antenna and in each channel of the multi-channel, correspondingly to the MIMO scheme, and to generate a receiving synchronization signal using the receiving power distribution value; and a synchronization unit configured to synchronize frames for the data receiving of the receiving unit using the receiving synchronization signal.

12 Claims, 4 Drawing Sheets

APPARATUS AND METHOD FOR RECEIVING DATA IN COMMUNICATION SYSTEM

CROSS-REFERENCES TO RELATED APPLICATIONS

The present application claims priority of Korean Patent Application Nos. 10-2010-0133876 and 10-2011-0140663, filed on Dec. 23, 2010, and Dec. 22, 2011, respectively, which are incorporated herein by reference in their entirety.

BACKGROUND OF THE INVENTION

1. Field of the Invention

Exemplary embodiments of the present invention relate to a communication system; and, more particularly, to an apparatus and method for normally receiving data by obtaining a receiving synchronization of data received through a multi-channel in a MIMO (multi-input multi-output) scheme in a communication system that provides a multi-user with services in the MIMO scheme.

2. Description of Related Art

In a current communication system, research has been actively conducted on a method for providing users with services having various quality of services (hereinafter referred to as 'QoS') with a high transmission rate. In a wireless local area network (hereinafter referred to as 'WLAN') system as an example of the communication system, research has been actively conducted on methods for stably transmitting large data at high speed through a limited resource. Particularly, in a communication system, research has been conducted on data transmission through a wireless channel. Recently, methods for normally transmitting/receiving large data by effectively using limited wireless channels have been proposed in the WLAN system.

Meanwhile, in a recent communication system, a method for providing a multi-user with services through a multi-channel in a MIMO scheme has been proposed. Particularly, as the WLAN system transmits/receives large data through a multi-channel in the MIMO scheme, researches have been actively conducted on a method for normally transmitting/receiving large data transmitted/received on a multi-channel, by a multi-user.

However, in a current communication system, for example, a WLAN system, there are problems occurring when the system normally transmits and receives large data with a multi-antenna through a multi-channel, that is, in a MIMO scheme. In a current WLAN system, particularly, when large data is transmitted through a multi-channel in the MIMO scheme, data receiving synchronization is necessarily needed to normally receive the large data transmitted. In a current WLAN system, however, a data receiving synchronization method for normally receiving large data, especially, a data receiving synchronization method for transmitting/receiving large data through a multi-channel in a MIMO scheme, has not been proposed yet.

Accordingly, in a communication system, for example, a WLAN system, when large data is transmitted to a multi-user using a multi-antenna through a multi-channel, that is, in a MIMO scheme, a method for normally receiving large data by correctly obtaining a data receiving synchronization is needed.

SUMMARY OF THE INVENTION

An embodiment of the present invention is directed to an apparatus and method for receiving data in a communication system.

Another embodiment of the present invention is directed to an apparatus and method for normally receiving large data by correctly obtaining a data receiving synchronization in a communication system that provides a multi-user with service through a multi-channel in a MIMO scheme.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for receiving data in a communication system, includes a receiving unit configured to receive data through a multi-channel in a MIMO (Multi-Input Multi-Output) scheme; a calculating unit configured to calculate a receiving power distribution value in each antenna of a multi-antenna and in each channel of the multi-channel, correspondingly to the MIMO scheme, and to generate a receiving synchronization signal using the receiving power distribution value; and a synchronization unit configured to synchronize frames for the data receiving of the receiving unit using the receiving synchronization signal.

In accordance with another embodiment of the present invention, a method for receiving data in a communication system, includes receiving data through a multi-channel in a MIMO (Multi-Input Multi-Output) scheme; calculating a receiving power distribution value in each antenna of a multi-antenna and in each channel of the multi-channel, correspondingly to the MIMO scheme, and generating a receiving synchronization signal using the receiving power distribution value; and synchronizing a frame for the data receiving using the receiving synchronization signal.

DESCRIPTION OF SPECIFIC EMBODIMENTS

Figure 1:
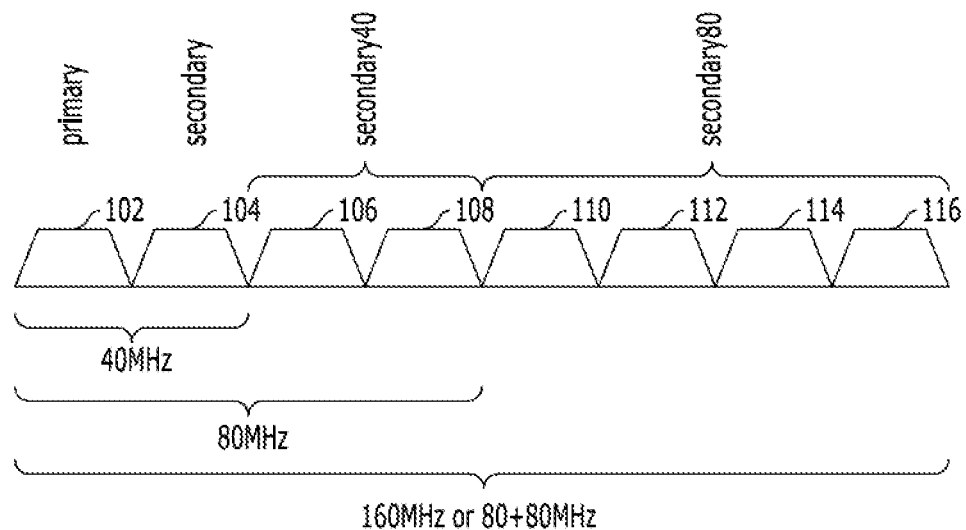
FIG. 1 is a view schematically illustrating a structure of a multi-channel in a communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention proposes an apparatus and method for receiving data in a communication system, for example, a wireless local area network (hereinafter referred to as 'WLAN') system. Here, while the WLAN system is described as an example in an embodiment of the present invention, a method for transmitting/receiving data proposed in the present invention can also be applied to other communication systems.

Further, in an embodiment of the present invention, it is possible to normally receive large data at a high speed by correctly obtaining a data receiving synchronization in a communication system that provides a multi-user with services through a multi-channel in a multi-input multi-output (referred to 'MIMO', hereinafter) scheme. Here, in an embodiment of the present invention, when data is received through the multi-channel in a MIMO scheme, a receiving power is calculated in each channel and in each antenna, respectively, a receiving power distribution value for a multi-antenna in the multi-channel is identified, and then a data receiving synchronization is obtained according to the receiving power distribution value. For example, a data receiving synchronization can be obtained based on channel and antenna having the maximum receiving power among the receiving power distribution values for the multi-channel and multi-antenna, a data receiving synchronization can be obtained based on channel and antenna corresponding to an average value of the receiving power distribution values for the multi-channel and multi-antenna, or a data receiving synchronization can be obtained in consideration of a deviation value or standard deviation value of the receiving power distribution values for the multi-channel and multi-antenna. Then, here, a multi-channel in a communication system in accordance with an embodiment of the present invention will be described in more detail with reference to FIG. 1.

FIG. 1 is a view schematically illustrating a structure of a multi-channel in a communication system in accordance with an embodiment of the present invention.

Referring to FIG. 1, the communication system, for example, a WLAN system, supports a multi-user-MIMO scheme in a multi-channel. In the WLAN system, accordingly, an access point (referred to 'AP', hereinafter) transmits relevant large data to the multi-user through a multi-channel, that is, a plurality of channel bands 102, 104, 106, 108, 110, 112, 114 and 116 in a MIMO scheme. Accordingly, terminals of the multi-user, for example, stations (referred to 'STA', hereinafter) receive the large data through the multi-channel in the MIMO scheme.

Further, the STAs transmit data to the AP through the multi-channel in a MIMO scheme and the AP receives the data through the multi-channel in a MIMO scheme. Here, when the STAs receive the data through the multi-channel in a MIMO scheme or the AP receives the data through the multi-channel in the MIMO scheme, data receiving apparatuses of the AP and STAs obtain a data receiving synchronization in order to normally receive the data in the MIMO scheme, the data having been transmitted through the multi-channel by the STAs or AP. That is, the data receiving apparatus obtains a data receiving synchronization for the data received through the multi-channel in a MIMO scheme and then normally receives the data through the data receiving synchronization obtained. Then, here, a data receiving apparatus in a communication system in accordance with an embodiment of the present invention will be described in more detail with reference to FIG. 2.

Figure 2:
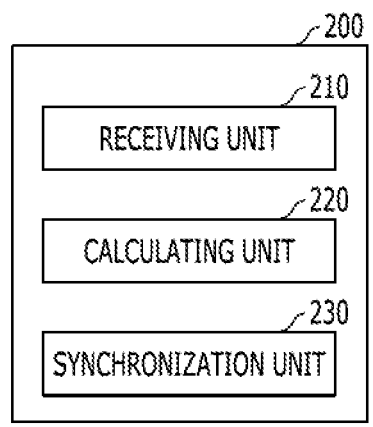
FIG. 2 is a view schematically illustrating a structure of an apparatus for receiving data in a communication system in accordance with an embodiment of the present invention.

FIG. 2 is a view schematically illustrating a structure of an apparatus for receiving data in a communication system in accordance with an embodiment of the present invention.

Referring to FIG. 2, the data receiving apparatus includes a receiving unit 210 configured to receive data through a multi-channel in a MIMO scheme, a calculating unit 220 configured to calculate a receiving power distribution value in each channel of a multi-channel to which the data is received and in each antenna of a multi-antenna to which the data is received and to generate a receiving synchronization signal, and a synchronization unit 230 configured to synchronize a frame through a receiving synchronization signal generated and to obtain a data receiving synchronization.

The calculating unit 220 calculates a synchronization value using an auto-correlation function for each channel of the multi-channel and each antenna of the multi-antenna. Further, the calculating unit 220 calculates receiving powers in each channel of the multi-channel and in each antenna of the multi-antenna, respectively, and calculates receiving power distribution values for each channel of the multi-channel and each antenna of the multi-antenna, through the receiving powers calculated. Further, the calculating unit 220 generates a data receiving synchronization value, that is, a receiving synchronization signal by applying the receiving power distribution value into the synchronization value. That is, the receiving synchronization signal includes the data receiving synchronization value in which the receiving power distribution value is applied into the synchronization value as described above.

Here, when the receiving power distribution value is applied into the synchronization value, the calculating unit 220 applies the receiving power distribution value into the synchronization value in order to obtain a data receiving synchronization from the receiving power distribution value for the multi-channel and multi-antenna based on the channel and antenna having the maximum receiving power, applies the receiving power distribution value into the synchronization value in order to obtain a data receiving synchronization based on the channel and antenna corresponding to an average value of the receiving power distribution value for the multi-channel and multi-antenna, or applies the receiving power distribution value into the synchronization values in order to obtain the data receiving synchronization in consideration of deviation value or standard deviation value of the receiving power distribution values for the multi-channel and multi-antenna.

The receiving synchronization signal including the data receiving synchronization value that is generated by applying the receiving power distribution value into the synchronization value is transmitted to the synchronization unit 230, and the synchronization unit 230 synchronizes a data receiving in the receiving unit 210 using the data receiving synchronization value included in the receiving synchronization signal.

That is, as described above, the receiving unit 210 obtains the data receiving synchronization using the data receiving synchronization value in which a receiving power distribution value is applied to the synchronization value, obtains the data receiving synchronization from the receiving power distribution value for the multi-channel and multi-antenna based on the channel and antenna having the maximum receiving power, obtains the data receiving synchronization based on the channel and antenna corresponding to an average value of the receiving power distribution values for the multi-channel and multi-antenna, or obtains the data receiving synchronization in consideration of deviation value or standard deviation value of the receiving power distribution values for the multi-channel and multi-antenna. The receiving unit 210 that obtained the data receiving synchronization synchronizes frames to receive the data packet and then normally receives the data packet that is received through the multi-channel in a MIMO scheme. Then, here, the data receiving synchronization value calculation in the communication system in accordance with an embodiment of the present invention will be described in more detail with reference to FIGS. 3 and 4.

Figure 3:
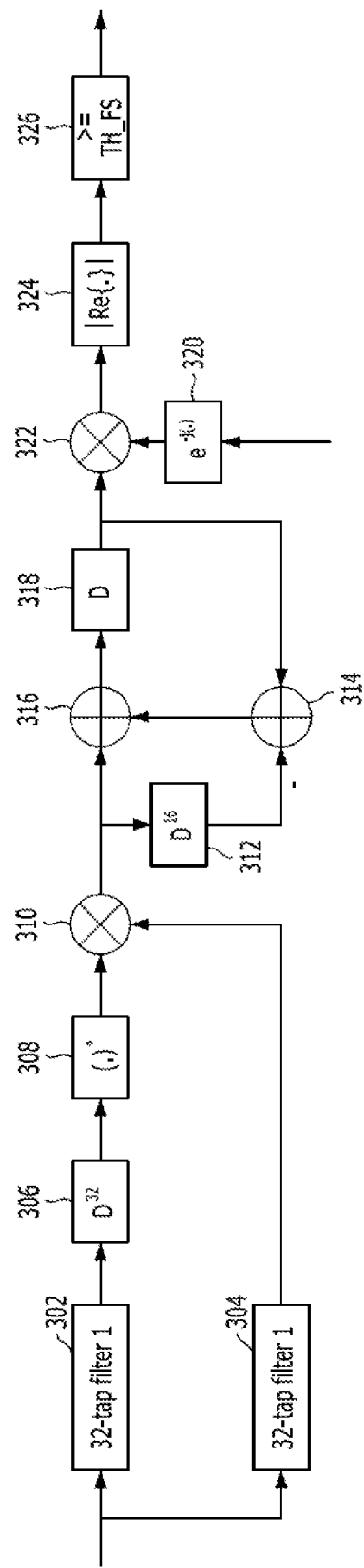
FIGS. 3 and 4 are views schematically illustrating a structure of a calculating unit of an apparatus for receiving data in a communication system in accordance with an embodiment of the present invention.
Figure 4:
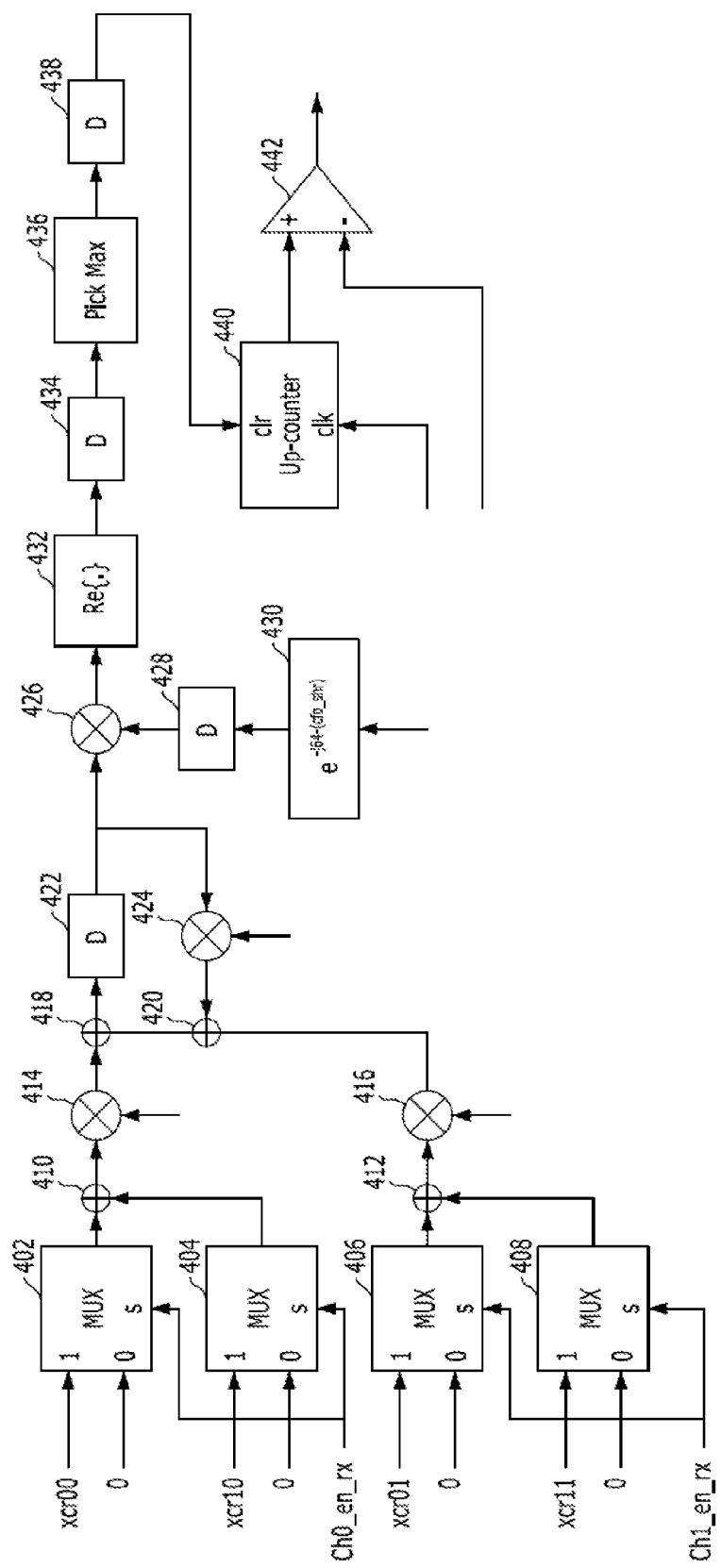

FIGS. 3 and 4 are views schematically illustrating a structure of a calculating unit of an apparatus for receiving data in a communication system in accordance with an embodiment of the present invention. Here, FIG. 3 is a view schematically illustrating a structure of the calculating unit in case of receiving data through a single channel and FIG. 4 is a view schematically illustrating a structure of the calculating unit in case of receiving data through a multi-channel, for example, two multi-channel. As described above, in case of receiving data through a multi-channel in a MIMO scheme, since the calculating unit illustrated in FIG. 4 exists in each antenna of the multi-antenna, a detailed description thereof will be omitted here.

First, referring to FIG. 3, the calculating unit includes matching filters 302 and 304, delay units 306, 312 and 318, a conjugator 308, multipliers 310 and 322, adders 316 and 314, a phase converter 320, a power calculator 324 and a comparator 326.

Here, the calculating unit calculates a synchronization value by an auto-correlation function through the matching filters 302 and 304, the delay units 306, 312 and 318, the conjugator 308, the multipliers 310 and 322, the adders 316 and 314, and the phase converter 320, and outputs a data receiving synchronization value through the comparator 326 by applying a receiving power distribution value calculated through the power calculator 324 into the synchronization value.

Further, referring FIG. 4, the calculating unit includes MUXs (multiplexers) 402, 404, 406 and 408, adders 410, 412, 418 and 420, multipliers 414, 416, 424 and 426, delay units 422, 428, 434 and 438, a phase converter 430, a real number deriver 432, a maximum value calculator 436, a counter 440 and a comparator 442.

Here, the calculating unit calculates a synchronization value by an auto-correlation function through the MUXs 402, 404, 406 and 408, the adders 410, 412, 418 and 420, the multipliers 414, 416, 424 and 426, the delay units 422, 428, 434, the phase converter 430, and the real number deriver 432, and outputs a data receiving synchronization value through the counter 440 and comparator 326 by applying a receiving power distribution value calculated through the maximum value calculator 436 and delay unit 438 into the synchronization value.

Further, in an embodiment of the present invention, although it was not illustrated in detail, when the data receiving apparatus receives data through a multi-channel in a MIMO scheme, the calculating unit calculates a data receiving synchronization value, the calculating unit being included as the calculating unit illustrated in FIG. 4 in each antenna of the multi-antenna. Then, here, a data receiving operation in the communication system in accordance with an embodiment of the present invention will be described in more detail with reference to FIG. 5.

Figure 5:
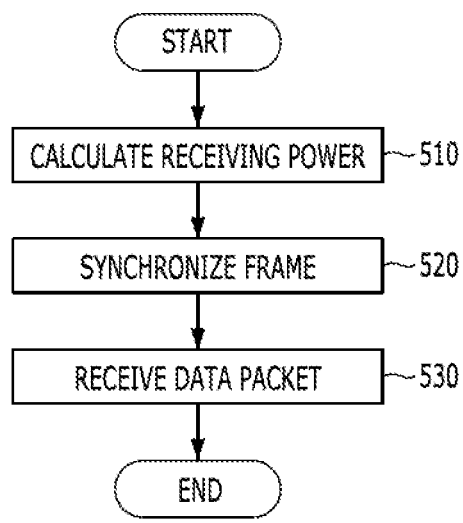
FIG. 5 is a view schematically illustrating an operation procedure of an apparatus for receiving data in a communication system in accordance with an embodiment of the present invention.

FIG. 5 is a view schematically illustrating an operation procedure of an apparatus for receiving data in a communication system in accordance with an embodiment of the present invention.

Referring to FIG. 5, the data receiving apparatus receives data through a multi-channel in a MIMO scheme, calculates a receiving power in each channel of the multi-channel and each antenna of the multi-antenna, and calculates a receiving power distribution value for each channel of the multi-channel and each antenna of the multi-antenna, through the receiving power calculated, at step 510. Here, the synchronization value is calculated using an auto-correlation function for each channel of the multi-channel and each antenna of the multi-antenna.

Subsequently, a frame synchronization is performed to receive a data packet through a data receiving synchronization value by applying the receiving power distribution value into the synchronization value at step 520. Here, the receiving unit obtains the data receiving synchronization using the data receiving synchronization value in which a receiving power distribution value is applied into the synchronization value, obtains the data receiving synchronization from the receiving power distribution value for the multi-channel and multi-antenna based on the channel and antenna having the maximum receiving power, obtains the data receiving synchronization based on the channel and antenna corresponding to an average value of the receiving power distribution value for the multi-channel and multi-antenna, or obtains the data receiving synchronization in consideration of deviation value or standard deviation value of the receiving power distribution values for the multi-channel and multi-antenna.

Next, the frame synchronization is performed and then the data packet that is received through the multi-channel in a MIMO scheme is normally received, at step 530.

According to the present invention, it is possible to normally receive large data by correctly obtaining a data receiving synchronization using a data receiving power in a communication system that provides a multi-user with services through a multi-channel in a MIMO scheme, thereby stably providing a multi-user with services.

While the present invention has been described with respect to the specific embodiments, it will be apparent to those skilled in the art that various changes and modifications may be made without departing from the spirit and scope of the invention as defined in the following claims.

What is claimed is:

1. An apparatus for receiving data in a communication system, the apparatus comprising:
   a receiving unit configured to receive data through a multi-channel in a MIMO (multi-input multi-output) scheme;
   a calculating unit configured to:
   calculate a receiving power for each antenna of a multi-antenna and for each channel of the multi-channel in the MIMO scheme;
   calculate a receiving power distribution value that is based on the calculated receiving power for each antenna of the multi-antenna and for each channel of the multi-channel in the MIMO scheme;
   calculate, using an auto-correlation function, a synchronization value for the data received by the receiving unit; and
   generate a receiving synchronization signal through counting and comparing, by applying the calculated receiving power distribution value through maximum value calculating and delaying into the calculated synchronization value; and
   a synchronization unit configured to synchronize frames of the data received by the receiving unit using the generated receiving synchronization signal,
   wherein the synchronization value is calculated through the auto-correlation function by performing multiplexing, adding, multiplying, delaying, phase-converting, and real number deriving for the data received by the receiving unit, and
   wherein the receiving unit normally receives the data through the multi-channel in the MIMO scheme based on the synchronized frames.

2. The apparatus of claim 1, wherein the calculating unit calculates a data receiving synchronization value by applying the receiving power distribution value to the synchronization value, and generates the receiving synchronization signal using the calculated data receiving synchronization value.

3. The apparatus of claim 2, wherein the synchronization unit synchronizes the data received by the receiving unit using the calculated data receiving synchronization value.

4. The apparatus of claim 3, wherein the synchronization unit synchronizes the data received by the receiving unit using a channel and an antenna having a maximum receiving power.

5. The apparatus of claim 3, wherein the synchronization unit synchronizes the data received by the receiving unit using a channel and an antenna associated with an average value of the receiving power distribution values for the multi-channel and multi-antenna.

6. The apparatus of claim 3, wherein the synchronization unit synchronizes the data received by the receiving unit using a deviation value or a standard deviation value of the receiving power distribution values for the multi-channel and multi-antenna.

7. A method for receiving data in a communication system, the method comprising:
  receiving data through a multi-channel in a MIMO (Multi-Input Multi-Output) scheme;
  calculating a receiving power for each antenna of a multi-antenna and for each channel of the multi-channel in the MIMO scheme;
  calculating a receiving power distribution value that is based on the calculated receiving power for each antenna of the multi-antenna and for each channel of the multi-channel in the MIMO scheme;
  calculating, using an auto-correlation function, a synchronization value for the received data;
  generating a receiving synchronization signal through counting and comparing, by applying the calculated receiving power distribution value through maximum value calculating and delaying into the calculated synchronization value; and
  synchronizing frames of the received data using the generated receiving synchronization signal,
  wherein the synchronization value is calculated through the auto-correlation function by performing multiplexing, adding, multiplying, delaying, phase-converting, and real number deriving for the received data, and
  wherein the data are normally received through the multi-channel in the MIMO scheme based on the synchronized frames.

8. The method of claim 7, wherein generating the receiving synchronization signal includes:
  calculating a data receiving synchronization value by applying the receiving power distribution value to the synchronization value; and
  generating the receiving synchronization signal using the calculated data receiving synchronization value.

9. The method of claim 8, wherein synchronizing the frame of the received data using the generated receiving synchronization signal includes:
  synchronizing the frame of the received data using the calculated data receiving synchronization value.

10. The method of claim 9, wherein synchronizing the frame of the received data using the generated receiving synchronization signal includes:
  synchronizing the frame of the received data based on a channel and an antenna having a maximum receiving power.

11. The method of claim 9, wherein synchronizing the frame of the received data using the generated receiving synchronization signal includes:
  synchronizing the frame of the received data using a channel and an antenna associated with an average value of the receiving power distribution values for the multi-channel and multi-antenna.

12. The method of claim 9, wherein synchronizing the frame of the received data using the generated receiving synchronization signal includes:
  synchronizing the frame of the received data using a deviation value or a standard deviation value of the receiving power distribution values for the multi-channel and multi-antenna.

* * * * *